Aug. 21, 1934.　　　M. J. ELIAS　　　1,970,887
RUMBLE SEAT TOP AND INCLOSURE
Filed July 11, 1933　　3 Sheets-Sheet 1
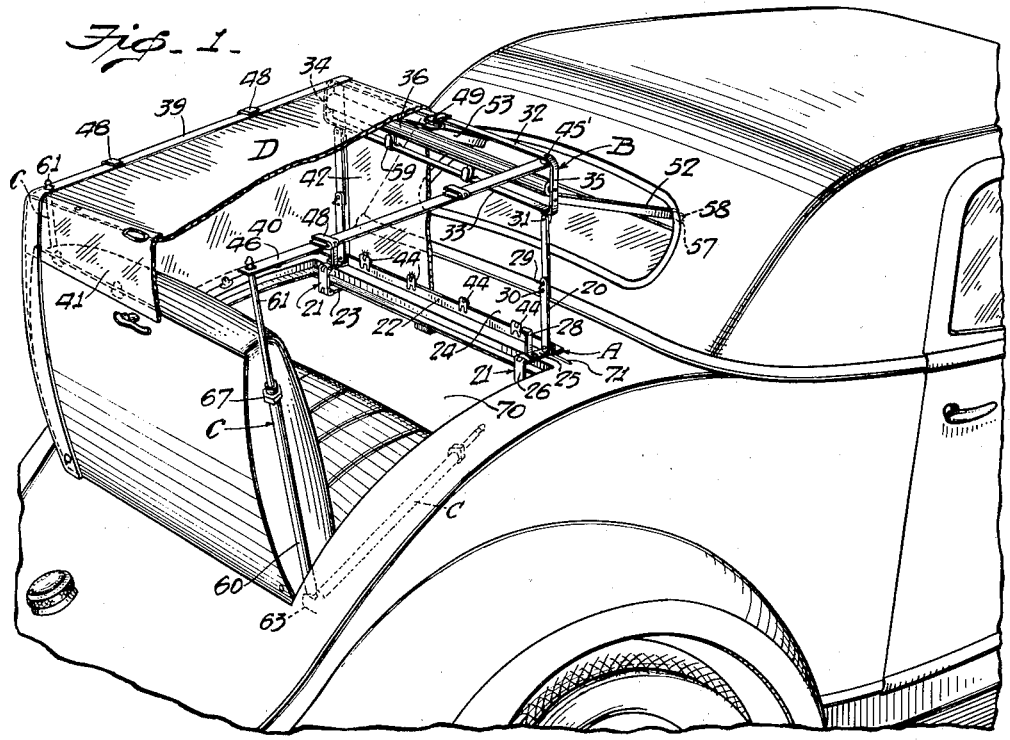
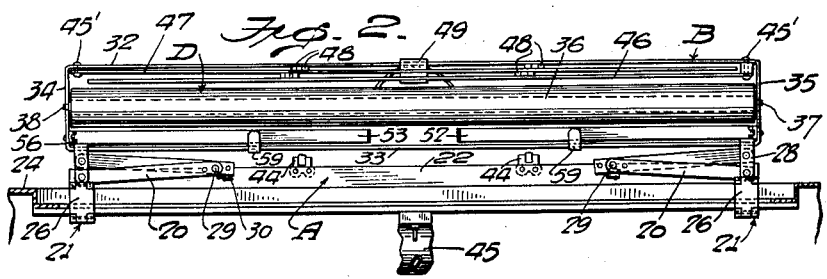
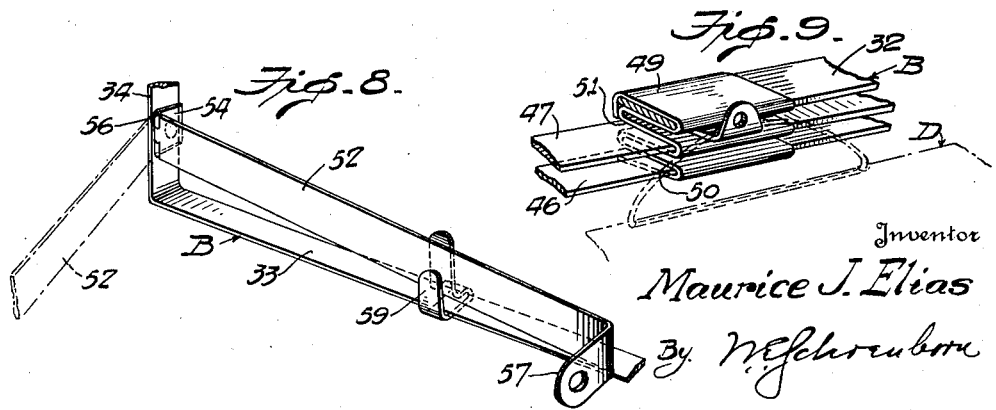
Inventor
Maurice J. Elias Aug. 21, 1934.  M. J. ELIAS  1,970,887
RUMBLE SEAT TOP AND INCLOSURE
Filed July 11, 1933  3 Sheets-Sheet 2
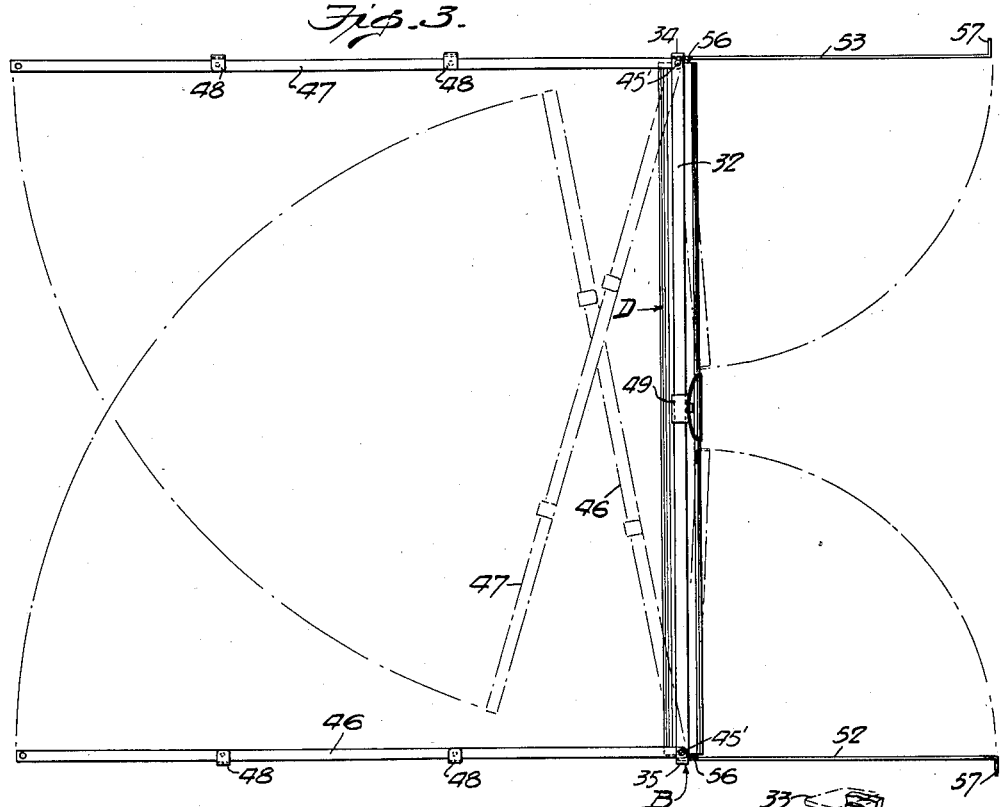
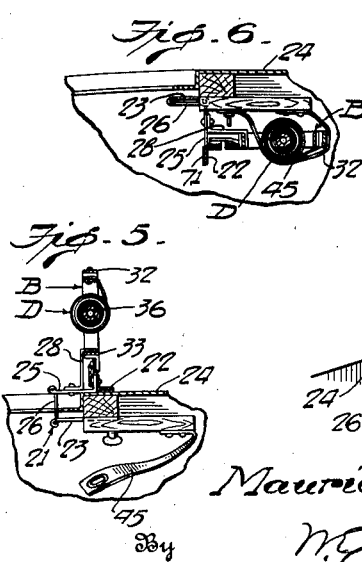
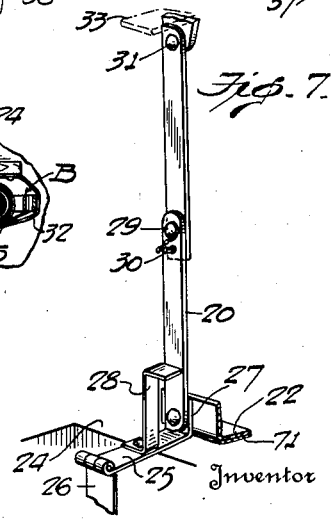
Inventor
Maurice J. Elias
By W. J. Schoenborn
Attorney Aug. 21, 1934. M. J. ELIAS 1,970,887
RUMBLE SEAT TOP AND INCLOSURE
Filed July 11, 1933 3 Sheets-Sheet 3
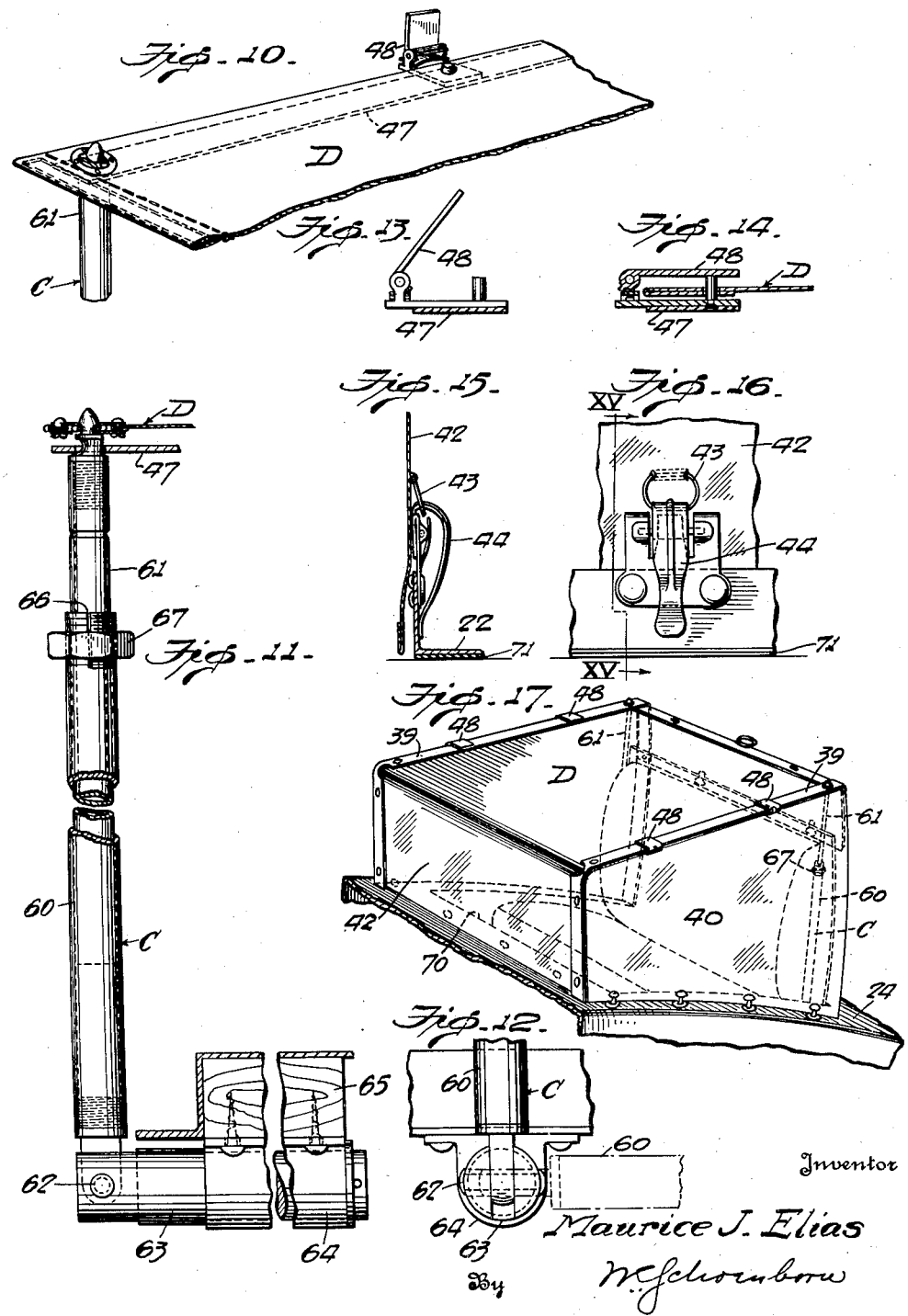

Patented Aug. 21, 1934

1,970,887

UNITED STATES PATENT OFFICE 1,970,887

RUMBLE SEAT TOP AND INCLOSURE

Maurice J. Elias, Long Island City, N. Y.

Application July 11, 1933, Serial No. 679,949

7 Claims. (Cl. 296—98)

This invention relates to an emergency top or covering for the rumble seat of an automobile, and especially to a roller type of top which is constructed to be stored in the rear compartment of the automobile.

An object of the invention is to provide a structure which can be readily placed in operative position by the occupants of the rumble seat without getting out of their seats, thereby not only saving time but also preventing exposure to a sudden down pour of rain.

A further object of the invention is to provide an improved means for mounting and supporting the top so that it may be quickly and easily put in operative position without necessitating the removal of the occupants from the automobile.

A further object of the invention is to provide a structure which, when in its inoperative position, will occupy comparatively little space.

A further object of the invention is to provide a structure which is supported by the forward deck of the rumble seat and which, when in its inoperative position, will in no way interfere with the comfort of those occupying the rumble seat.

A further object of the invention is the provision of a rumble seat cover of the above indicated character, which will be simple, durable and efficient, and which may be manufactured and sold at a comparatively low cost.

Other objects and advantages of applicant's invention will appear from the detailed description of the several parts, the mode of assembling the same, and manner of cooperation to be presently explained.

With these and other objects in view, the invention consists of the structural characteristics and relative arrangement of the elements, which will be hereinafter more fully described and particularly pointed out in the appended claims.

In the three sheets of drawings, in which similar reference characters indicate the same parts in the several figures:

Figure 1 is a perspective view of the rear end of an automobile, showing the rumble seat in its open position and the improved covering in position;

Figure 2 is a view showing the top carrying roller and its support positioned in its collapsed position above the forward deck of the rumble seat;

Figure 3 is a view showing the movement or path of travel made by the bracing members and top supporting elements;

Figure 4 is a sectional view, showing the top carrying roller in its uppermost or extended position above the forward deck of the rumble seat;

Figure 5 is a fragmentary sectional view similar to Figure 4, showing the top carrying roller in its lower position;

Figure 6 is a sectional view, showing the roller fastened in its inoperative position beneath the forward deck of the rumble seat;

Figure 7 is a view, showing a partial structure of the multiple pintle hinge and the forward folding upright in its extended position;

Figure 8 is a view, showing the bracing member in its inoperative position;

Figure 9 is a fragmentary view, showing the spring clamp for the top supporting strips;

Figure 10 is a fragmentary view, showing the mode of attachment of the cover to the rear side supports;

Figure 11 is an enlarged detailed view of one of the two telescoping rear supports and its mode of connection to the body of the automobile;

Figure 12 is a view showing the rear support in its inoperative position beneath the side flange of the rumble seat compartment;

Figure 13 is a detailed view of one of the top clamps in its open position;

Figure 14 is a cross sectional view of one of the top clamps with a portion of the top clamped therein;

Figure 15 is a sectional view on line XV—XV of Figure 16;

Figure 16 is a plan view of one of the front curtain fasteners; and,

Figure 17 is a view showing the covering in position over the rumble seat.

According to the embodiment of the invention shown in the drawings, the rumble seat cover includes in its organization a base A provided with folding uprights 20, which are adapted to support a frame B, rear telescoping elements C, which are pivotally connected to either side of the rumble seat compartment 70, and a water repellant cover D, which is rolled upon a spring roller to be presently more particularly identified and described.

The base A comprises a pair of multiple pintle three plate hinges 21, which are spaced apart by a trough 22, said trough having secured to its under side a flat strip of rubber 71 (see Figures 1 and 15), or other gasket material for preventing water flowing down and entering the rumble seat compartment 70. One plate 23 of the hinge is secured to the under side of the forward deck 24 of the rumble seat compartment 70, and another plate 25 of the hinge is secured to plate 23 by an intermediate plate 26. Plate 25 has its outer end bent at a right angle to its length, as indicated in Figure 7 at 27. This construction provides a means for connecting the trough 22 and the folding upright 20 to the aforementioned hinges. A bracket 28 is pivotally connected to plate 25, as shown in Figures 4, 5, 6 and 7, for locking the folding upright 20 in its folded position. The upright 20 includes a pair of sections which are pivotally attached to each other, as shown at 29, Figure 7. Provision is made at 30 for securing said upright in its extended position. The upper extremity of upright 20 is pivotally connected at 31 to the roller supporting frame B. Thus, it will be seen that frame B is carried by base A, and that, in addition to being supported thereby, see Figure 6, by means of straps 45, when in its inoperative position beneath the forward deck of the rumble seat, base A serves to support it when swung to its operative position above the forward deck 24 of the rumble compartment 70, as shown in Figures 4 or 5.

Frame B is made from a single piece of metal stock, which is bent to form a rectangle. Intermediate the two parallel horizontal sides 32 and 33 of the rectangle, and supported by the vertical ends 34 and 35 thereof, is positioned a roller 36, which is of the ordinary spring roller type for shades, having trunnions 37 and 38; one of the trunnions being round and rotatable with the roller, and the other rectangular in cross section and connected to the spring of the roller, said trunnions fitting in correspondingly shaped openings in the vertical ends 34 and 35 of said frame B.

Secured to the roller 36 is the top or cover element D, which is formed of any suitable water repellant substance, and connected to said top by a continuous strip 39 are the transparent water proof side curtains 40 and the rear curtains 41. The front curtain 42 is also transparent, and is secured to the roller 36, as is the top D. There are a series of small ringlets 43, Figures 15 and 16, attached to the free end of curtain 42, that are adapted to coact with an equal number of catches 44, which are positioned along the length of spacer member 22 to thereby hold said front curtain in position in defiance of the elements. The top and front curtains, when rolled, form a compact roll, as shown in Figures 4, 5 and 6, which roll fits snugly under the forward deck 24 of the rumble seat, as shown in Figure 6, when not in use, and is secured in said position by means of previously described flexible strap 45.

Pivotally attached to the under side of the upper horizontal member of frame B, and, as indicated at 45 and 45', are two flat strips of metal 46 and 47, which, when in their extended position, see Figures 1 and 2, serve to support the top curtain D and the side curtains 40. Spaced along the length of the strip are clamping members 48, which are adapted to securely hold the top curtain in position. The clamps are of ordinary hinge type of clamp and are shown in detail in Figures 13 and 14. Suitable openings, as is common in this class of covers, are formed in the ends of strips 46 and 47 for engagement with the upper ends of uprights 61 of telescoping elements, which elements will be hereinafter more fully explained.

Positioned midway of the upper horizontal side 32 of frame B is a spring catch 49, Figure 9, which is made of spring steel and which is bent upon itself so as to form two clamping jaws 50 and 51. This catch constitutes a means for holding the two top supporting members 46 and 47 in their folded or inoperative position.

Pivotally attached to the two vertical ends 34 and 35 of the frame B are bracing members 52 and 53. These braces are identical in structure. Therefore, referring to Figure 8, it will be seen that they are composed of two parts, a part 54 thereof being pivotally connected to a side 34 of frame B, and the other portion 55 is hinged, as at 56, to portion 54. The free end of brace 53 is bent L-shaped in form as shown at 57, see Figure 8. By this construction, brace 53 may, when in its extended position, and upon lowering the rear window of the automobile, be inserted therein, thus allowing said L-shaped end 57 of brace 53 to be in the recess of the rear window slide after said window is partially lowered, as indicated by the dotted lines in Figure 1 at 58.

When brace 53 is in its folded position, it is held in said position by a U-shaped clamp 59, which is attached to the lower horizontal member 33 of frame B, as shown in Figure 8. There are two such lamps 59 positioned on sides 33 of frame B, one for each brace.

The two telescoping rear supporting members C, as shown in Figure 11, each consists of a hollow post 60 and a top supporting rod 61. The lower end of each post 60 is pivoted at 62 to a shaft 63. Shafts 63 are journaled in bearings 64, which are properly secured to the rear and under side frames 65, which support the outer edges of the compartment in any suitable manner.

Thus, it will be seen that rod 61 will slide in post 60, and in order to hold said rods 61 in various elevations relative to said post 60, the end of said post is slightly tapered and screw threaded, and slotted, as at 66, and provided with a pinch nut 67, so that when said rod is to be removed, more or less, from the post the pinch nut is screwed downwardly, and when it is desired to hold the rod 61 in a given elevation the pinch nut 67 is screwed upwardly, thereby pressing the sides of the post toward each other by virtue of the slot, and thus compresses the slotted section of the post about the rod, thereby effecting its retention at any given position.

By the above detailed construction, it will be seen that the rear supporting members are adjustable as to length and vertical position. When not in use, the members are collapsed and swung about the pivot 62 to a position beneath the side flange of the rumble seat compartment, as shown in dotted lines in Figure 1.

When it is desired to employ my improved top, the occupants of the rumble seat, without leaving their seats, release the combined supporting and fastening member 45, see Figure 6, and swing the rolled top outwardly and up above the edge of the forward deck of the rumble seat, as shown in Figure 5. The folding pivotal uprights 20 are then straightened out and locked, as heretofore explained, in their upward position, as shown in Figures 4 and 7, after which the forwardly swinging braces 53 are positioned so that their outer braces 57 are inserted and held in the slide recess of the lowered rear window of the automobile, as readily understood. The rear supporting members C are then swung from beneath the side flanges of the rumble seat and their posts 60 and rods 61 raised to this vertical position and adjusted to their correct height in a manner as heretofore explained. The top supporting members 46 and 47 are then extended and connected to said rear supports. Thereupon the top D is unrolled from its roller and fastened to the frame.

Although the ends of the outer braces 57 are shown and described as inserted and held in the slide recess of the lowered window, it will be readily understood that said window need not be lowered as said ends of the braces 57 can be disposed between the outer surface of the closed window and the adjacent upright walls of said slide recess.

By my invention I provide a simple and efficient form of a disappearing top, which can be quickly, easily, and snugly stored beneath the forward deck of the rumble seat, without in any way interfering with the foot space of the rumble seat compartment, and, also, a top which is readily put in operative position by the occupants of said seat without the necessity of their having to leave their respective seats.

From the foregoing description of construction, relative cooperation of the several parts, and manner of using same all the functions and advantages recited in the statement of invention can be quickly and efficiently carried out in a minimum of time and without the use of a skilled mechanic.

It is, of course, to be understood that various changes and alterations may be made in the mechanical details of structure and arrangement of parts without departing from the spirit of this invention. Such changes will readily suggest themselves to those skilled in the art and require no specific illustration or description. They are to be understood as contemplated within the invention insofar as they fall within the scope of the appended claims.

What I claim is:

1. The combination with an automobile body having a main top for the driver's seat, a deck back of the main top, a rear compartment beneath said deck, an opening in said deck leading to said compartment, a hinge comprising two end plates pivotally connected to an intermediate plate, at each side of said rear compartment, and having one of its end plates secured to said deck adjacent to said opening and its intermediate plate so constructed, arranged and adapted to assume an upright position adjacent to the forward edge of said opening in said deck or in a position below said end plate secured to said deck, and the other end plate adapted to be supported by the exterior of said deck above said other and secured end plate or disposed in said rear compartment and under said deck directly below said secured end plate, a cover for said opening in said deck, and a support for said cover connected to said end plates supported on the exterior of the deck.

2. The combination with an automobile body having a main top for the driver's seat, a deck back of the main top, a rear compartment beneath said deck, an opening in said deck leading to said compartment and a rumble seat within said compartment, a multiple pintle hinge comprising two end plates pivotally connected to an intermediate plate, at each side of said rear compartment, and having one of its end plates secured in a horizontal position to the underside of said deck adjacent to the forward end of said opening and its intermediate plate adapted to assume a vertical position and normal to the adjacent edge of said opening in said deck or in a horizontal position below said end plate secured to said deck, and the other end plate adapted to have its free end supported on the outside of the deck above said other and secured end plate or disposed in said rear compartment and under said deck directly below said secured end plate, a cover for said opening in said deck, and a collapsible support for said cover connected to said end plates supported on the outside of the deck.

3. The combination with an automobile body having a main top for the driver's seat, a deck back of the main top, a rear compartment beneath said deck, an opening in said deck leading to said compartment and a rumble seat within said compartment, a multiple pintle hinge comprising two end plates pivotally connected to an intermediate plate, at each side of said rear compartment, and having one of its end plates secured in a horizontal position to the underside of said deck adjacent to the forward end of said opening and its intermediate plate adapted to assume a vertical position and normal to the adjacent edge of said opening in said deck or in a horizontal position below said end plate secured to said deck, and the other end plate adapted to have its free end supported on the outside of the deck above said other and secured end plate or disposed in said rear compartment and under said deck directly below said secured end plate, a cover for said opening in said deck, a roller for said cover, a roller carrying frame for said roller, and foldable uprights secured to said frame and said end plates adapted to be supported on the outside of said deck or disposed under said deck directly below said plates secured to the underside of said deck.

4. The combination with an automobile body having a main top for the driver's seat, a deck back of the main top, a rear compartment beneath said deck, an opening in said deck leading to said compartment, a hinge comprising two end plates pivotally connected to an intermediate plate, at each side of said rear compartment, and having one of its end plates secured to said deck adjacent to said opening and its intermediate plate so constructed, arranged and adapted to assume an upright position adjacent to the forward edge of said opening in said deck or in a position below said end plate secured to said deck, and the other end plate adapted to be supported by the exterior of said deck above said other and secured end plate or disposed in said rear compartment and under said deck directly below said secured end plate, a cover for said opening in said deck, a roller for said cover, a frame for supporting said roller, means for adjustably and hingedly connecting said frame to said plates adapted to be supported on the exterior of the deck, a pair of adjustable rear supporting elements at either side of the rear of said opening in the deck, and a plurality of upper supporting members extending from said frame to said rear supporting elements.

5. The combination with an automobile body having a main top for the driver's seat, a deck back of the main top, a rear compartment beneath said deck, an opening in said deck leading to said compartment and a rumble seat within said compartment, a multiple pintle hinge comprising two end plates pivotally connected to an intermediate plate, at each side of said rear compartment, and having one of its end plates secured in a horizontal position to the underside of said deck adjacent to the forward end of said opening and its intermediate plate adapted to assume a vertical position and normal to the adjacent edge of said opening in said deck or in a horizontal position below said end plate secured to said deck, and the other end plate adapted to have its free end supported on the outside of the deck above said other and secured end plate or disposed in said rear compartment and under said deck directly below said secured end plate, a cover for said opening in said deck, a roller for said cover, a frame rotatably supporting said roller, collapsible means for hingedly and adjustably connecting said frame to said end plates adapted to be supported on the exterior of the deck, rear supporting elements at either side of the rear of said opening in the deck, and a plurality of collapsible upper supporting members extending from said frame to said rear supporting members.

6. The combination with an automobile body having a main top for the driver's seat, a deck back of the main top, a rear compartment beneath said deck, an opening in said deck leading to said compartment, a hinge comprising two end plates pivotally connected to an intermediate plate, at each side of said rear compartment, and having one of its end plates secured to said deck adjacent to said opening and its intermediate plate so constructed, arranged and adapted to assume an upright position adjacent to the forward edge of said opening in said deck or in a position below said end plate secured to said deck, and the other end plate adapted to be supported by the exterior of said deck above said other and secured end plate or disposed in said rear compartment and under said deck directly below said secured end plate, a top cover for said opening in said deck, a front curtain, a single roller for said cover and curtain, a frame for supporting said roller, means for adjustably and hingedly connecting said frame to said plates adapted to be supported on the exterior of the deck, brace members for connecting said frame to said main top, a pair of adjustable rear supporting elements at either side of the rear of said opening in the deck, and a plurality of upper supporting members extending from said frame to said rear supporting elements.

7. The combination with an automobile body having a main top for the driver's seat, a deck back of the main top, a rear compartment beneath said deck, an opening in said deck leading to said compartment and a rumble seat within said compartment, a multiple pintle hinge comprising two end plates pivotally connected to an intermediate plate, at each side of said rear compartment, and having one of its end plates secured in a horizontal position to the underside of said deck adjacent to the forward end of said opening and its intermediate plate adapted to assume a vertical position and normal to the adjacent edge of said opening in said deck or in a horizontal position below said end plate secured to said deck, and the other end plate adapted to have its free end supported on the outside of the deck above said other and secured end plate or disposed in said rear compartment and under said deck directly below said secured end plate, a top cover for said opening in said deck, a front curtain, a single roller for said cover and curtain, a frame rotatably supporting said roller, collapsible means for hingedly and adjustably connecting said frame to said end plates adapted to be supported on the exterior of the deck, independent rear supporting elements at either side of the rear of said opening in the deck, a plurality of collapsible upper supporting members extending from said frame to said rear supporting members, side curtains attached to and suspended from said upper supporting members, and a rear curtain attached to and suspended from said rear supporting elements.

MAURICE J. ELIAS.